United States Patent [19]
Bruce

[11] Patent Number: 4,897,953
[45] Date of Patent: Feb. 6, 1990

[54] LOBSTER TRAP

[76] Inventor: Charles F. Bruce, R.F.D. 1, Box 1490, Rockland, Me. 04841

[21] Appl. No.: 316,236

[22] Filed: Feb. 27, 1989

[51] Int. Cl.⁴ ............................................. A01K 71/00
[52] U.S. Cl. ......................................... 43/102; 43/100
[58] Field of Search ................. 43/100, 101, 102, 103, 43/104, 105

[56] References Cited

U.S. PATENT DOCUMENTS 1,985,177  12/1934  Lawrence .............................. 43/100
3,373,523   3/1968  Olafson ................................. 43/100
3,906,655   9/1975  Lowenthal ............................ 43/100

Primary Examiner—Kurt Rowan

[57] ABSTRACT

Trap head for a lattice-work lobster trap case provides a pair of opposed openings in opposite sides of the case, a funnel-like net within the case interconnects the openings and provides a continuous lobster passage between them, the net decreasing in diameter with distance from the openings with its minimum diameter midway between the openings. An opening from the minimum diameter portion of the net into the interior of the case permits entrance of a lobster.

5 Claims, 1 Drawing Sheet

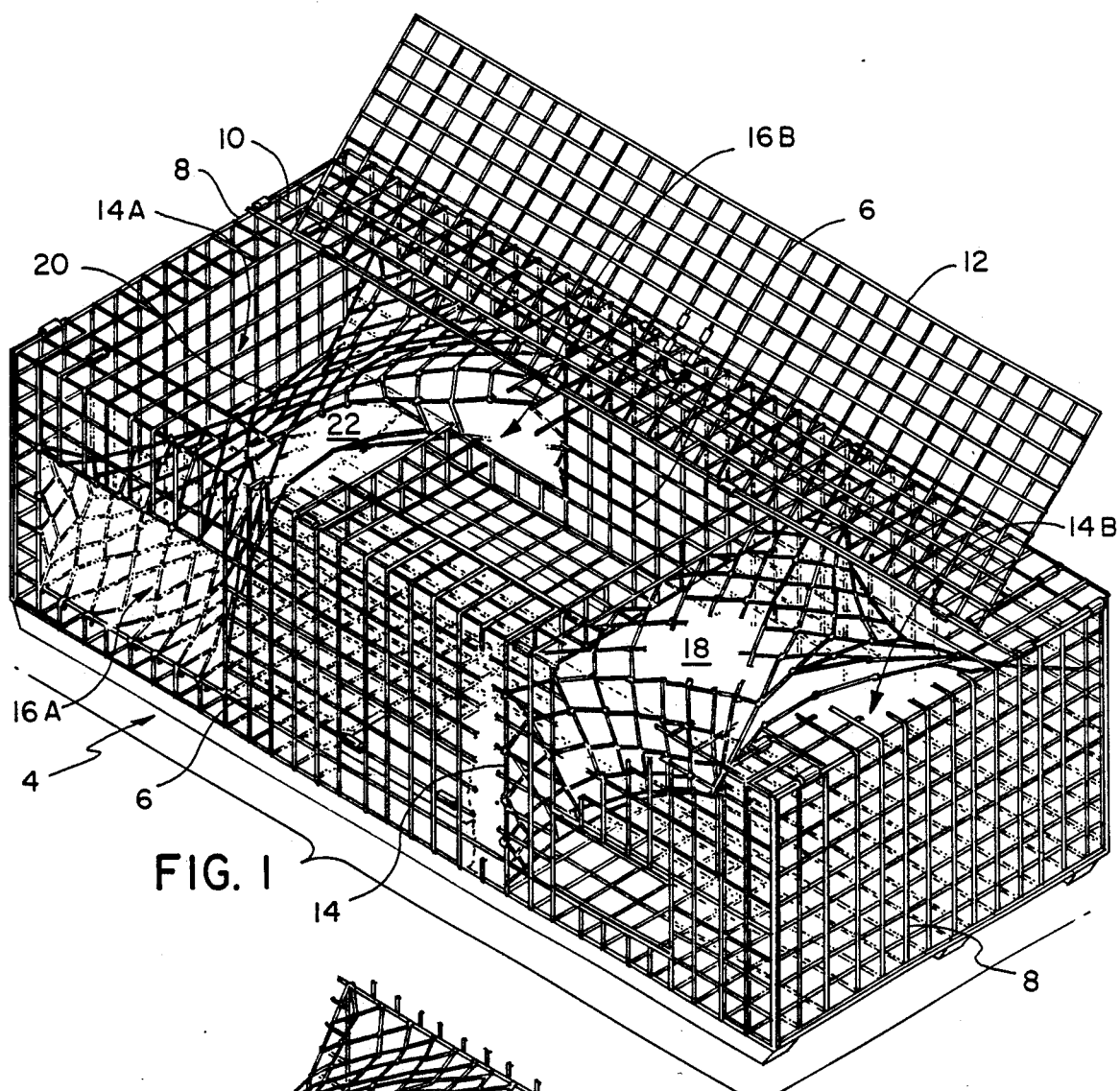
FIG. 1
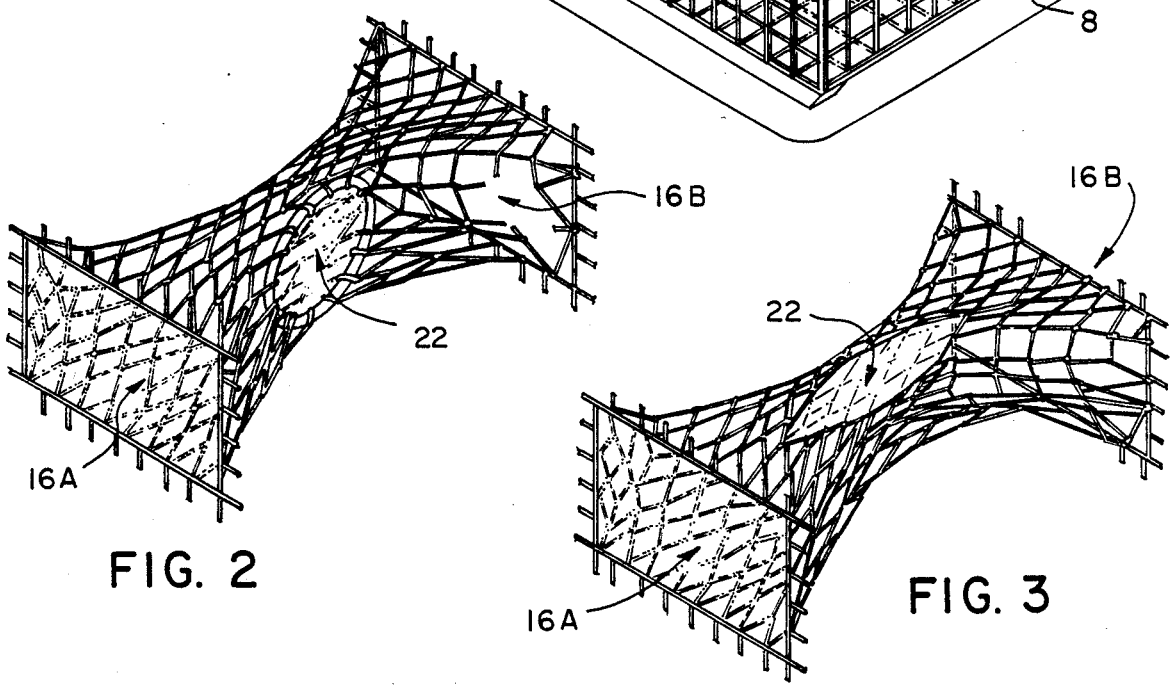
FIG. 2
FIG. 3

LOBSTER TRAP

This invention relates to lobster traps and provides a new and improved trap head which increases the likelihood of trapping lobsters.

BACKGROUND OF THE INVENTION

The conventional lobster trap comprises an oblong case which may be a metal cage or formed of wooden slats. Within the trap are usually two compartments. One of the compartments has a pair of opposed lobster-admitting openings in its lateral sides. A funnel-like net extends into the compartment from each opening. This compartment is separated from the second compartment by a partition which also is provided with a lobster-admitting opening from which extends a third funnel-like net.

The theory is that it is easier for lobsters to find their way into the trap than out. Hence, the tapered nets having a large entrance opening and a much smaller exit. The lobster is lured into the trap by bait placed there periodically by the lobster fisherman.

It is clear that the conventional trap provides the entering lobster with two exits to choose from. If the number of exits could be reduced to one his chances of escape would be halved.

It is the object of the invention to provide a trap construction reducing the possible exits for the trapped lobster from two to one.

SUMMARY OF THE INVENTION

In accordance with the invention there is provided in a lobster trap comprising a lattice-work case an improved trap head comprising means defining a pair of opposed openings in opposite sides of the case, a funnel-like net within said case interconnecting said openings and providing a continuous lobster passage between said openings, said net decreasing in diameter with distance from said openings and having its minimum diameter midway between said openings, and means defining an opening from the minimum diameter portion of said net into the interior of said case. Since there is but a single opening from the funnel-like net into the trap interior the lobster has only one possible exit instead of the two provided by the conventional trap.

In preferred embodiments, the opening from the minimum diameter portion of the said net may be circular or non-circular and it may face downwardly into the interior of said case or in a direction other than downwardly.

Still further objects, features and advantages of the invention will be apparent from the following detailed description of a presently preferred embodiment taken in conjunction with the accompanying drawings.

BRIEF DESCRIPTION OF THE DRAWINGS

FIG. 1 is a view in perspective of a metal cage-type lobster trap equipped with the novel head of the invention;

FIG. 2 is a view in perspective of one form of funnel-like net mounted within one of the compartments of the trap and establishing a narrowed passage between lateral openings in opposite trap walls; and FIG. 3 is a view similar to FIG. 2 of a modified form of funnel-like net according to the invention.

DETAILED DESCRIPTION OF PREFERRED EMBODIMENT

The cage-like trap is identified by the numeral 4. It is provided with side walls 6, end walls 8 and top 10. A lid 12 is hinged in the top 10 to provide access to the interior. The interior is divided into two compartments 14A and 14B by a partition 14.

Compartment 14A is provided with a pair of opposed openings 16A and 16B through which lobsters may enter from the exterior. The partition 14 likewise is provided with a lobster admitting opening 18. A funnel-like net extends within the compartment 14B from opening 18 so that lobsters can enter from compartment 14A.

The foregoing is conventional trap construction. According to the invention, the conventional individual funnel-like nets extending into compartment 14A from the side openings 16A and 16B are replaced by a single double funnel net 20 which establishes a narrowing passageway between the openings. The minimum diameter portion of this net is provided with an opening 22 into the interior of compartment 16A.

The opening 22 may be circular, as shown in FIG. 2, or eliptical, as shown on FIG. 3, or be of any other desired shape. It may open laterally into the compartment or face up or down or at an angle.

Operation

The fisherman first places bait in the compartment(s) and lowers the trap to the bottom of a the body of water, such as a bay extending in from the ocean. Lobsters sensing the presence of the bait enter the trap without difficulty due to the funnel-like configuration of both ends of the net 20 leading from the openings 16A and 16B. They may then enter the first compartment 14A through opening 22 midway of the net 20. From there they may progress into the second compartment 14B.

It will be apparent that any lobster in compartment 14A has available only one exit to the exterior of the trap, and that is through opening 22, whereas in the conventional trap, having two funnel-like nets, two exits are available. The lobster's chances of escape are thus effectively halved.

While I have herein disclosed and described a presently preferred embodiment of the invention it will nevertheless be understood that the same is meant to be by way of illustration and not limitation. Accordingly, it is intended that the scope of the invention be defined only by the proper interpretation to be accorded the appended claims.

I claim:

1. In a lobster trap comprising a lattice-work case an improved trap head comprising
    means defining a pair of opposed openings in opposite sides of the case,
    a funnel-like net within said case interconnecting said openings and providing a continuous lobster passage between said openings,
    said net decreasing in diameter with distance from said openings and having its minimum diameter midway between said openings, and
    means defining an opening from the minimum diameter portion of said net into the interior of said case.

2. The lobster trap of claim 1 wherein said opening from the minimum diameter portion of said net is circular.

3. The lobster trap of claim 1 wherein said opening from the minimum diameter portion of said net is non-circular.

4. The lobster trap of claim 1 wherein said opening from the minimum diameter portion of said net faces downwardly into the interior of said case.

5. The lobster trap of claim 1 wherein said opening from the minimum diameter portion of said net faces other than downwardly into the interior of said case.